(12) United States Patent
Lunden et al.

(10) Patent No.: US 10,779,232 B1
(45) Date of Patent: Sep. 15, 2020

(54) MEASUREMENT FOR FAST CELL ACCESS

(71) Applicant: Nokia Technologies Oy, Espoo (FI)

(72) Inventors: Jari Petteri Lunden, Espoo (FI); Elena Virtej, Espoo (FI); Tero Henttonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/764,921

(22) PCT Filed: Nov. 15, 2018

(86) PCT No.: PCT/EP2018/081336
§ 371 (c)(1),
(2) Date: May 18, 2020

(87) PCT Pub. No.: WO2019/096888
PCT Pub. Date: May 23, 2019

Related U.S. Application Data

(60) Provisional application No. 62/587,560, filed on Nov. 17, 2017.

(51) Int. Cl.
*H04W 48/20* (2009.01)
*H04W 24/10* (2009.01)
*H04W 24/08* (2009.01)

(52) U.S. Cl.
CPC .......... *H04W 48/20* (2013.01); *H04W 24/08* (2013.01); *H04W 24/10* (2013.01)

(58) Field of Classification Search
CPC .................................................. H04W 48/20
See application file for complete search history.

(56) References Cited

U.S. PATENT DOCUMENTS 8,838,035 B2 * 9/2014 Pica ...................... H04W 24/10
455/67.11
2017/0215228 A1 7/2017 Radulescu et al.

OTHER PUBLICATIONS

3GPP TSG-RAN WG2 #99bis, Prague, Czech Republic, Oct. 9-13, 2017, R2-1710996, "Faster idle mode measurements", Nokia, Nokia Shanghai Bell, 17 pgs.

(Continued)

*Primary Examiner* — Sulaiman Nooristany
(74) *Attorney, Agent, or Firm* — Harrington & Smith

(57) ABSTRACT

The example embodiments of the invention provide at least a method and apparatus to measure, by a user equipment, a communication quality with at least one measured cell of a communication node while the user equipment is in an idle or inactive state; upon the user equipment transitioning to a connected state, determine by the user equipment that the communication quality with the at least one measured cell is larger than a threshold; and transmit information comprising a measurement report from the user equipment to a network equipment that the at least one measured cell meets the threshold for the network equipment to signal the user equipment to configure communication with the at least one measured cell without further measurements from the user equipment. Further, a method and apparatus to receive by a network equipment information comprising a measurement report from a user equipment which is waking from an idle or inactive state and seeking access to a serving cell communication, wherein the measurement report comprises an identification of a cell which met a communication quality threshold with the user equipment while the user equipment was in the idle or inactive state; compare the measurement report received by the network equipment from the user equipment to a predetermined threshold value, wherein based on the comparing the network equipment is caused to configure communication with the cell without further mea- (Continued)

MEASURE, BY AN APPARATUS, A COMMUNICATION QUALITY WITH AT LEAST ONE MEASURED CELL OF A COMMUNICATION NODE WHILE THE APPARATUS IS IN AN IDLE OR INACTIVE STATE, WHERE THE APPARATUS COMPRISES A USER EQUIPMENT — 130

UPON THE USER EQUIPMENT TRANSITIONING TO A CONNECTED STATE, DETERMINING BY THE USER EQUIPMENT THAT THE COMMUNICATION QUALITY WITH THE AT LEAST ONE MEASURED CELL IS LARGER THAN A THRESHOLD — 132

TRANSMIT A MEASUREMENT REPORT FROM THE USER EQUIPMENT TO A NETWORK EQUIPMENT THAT THE LEAST ONE MEASURED CELL MEETS THE THRESHOLD FOR THE NETWORK EQUIPMENT TO SIGNAL THE USER EQUIPMENT TO CONFIGURE COMMUNICATION WITH THE LEAST ONE MEASURED CELL WITHOUT FURTHER MEASUREMENTS FROM THE USER EQUIPMENT — 134 surements from the user equipment, wherein based on the comparing the network equipment is caused to configure communication with the cell without further measurements from the user equipment; and send a signal from the network equipment to the user equipment with instructions for the user equipment to configure communication with the cell without further measurements from the user equipment.

16 Claims, 10 Drawing Sheets

(56)  References Cited

OTHER PUBLICATIONS

3GPP TSG-RAN2 Meeting #100, Reno, USA, Nov. 27-Dec. 1, 2017, R2-1712256, "Fast SCell configuration through Quick SCell Measurement Reporting", Qualcomm Incorporated, 7 pgs.
3GPP TSG-RAN WG2 Meeting #101, Sanya, China, Apr. 16-20, 2018, R2-1804764, "Configuration of IDLE mode measurements", Nokia, Nokia Shanghai Bell, 5 pgs.

* cited by examiner

```
-- ASN1START
IdleModeMeasurementConfig-r15 ::=   SEQUENCE {
    idleMeasuredCarriersEUTRA-r15   EUTRA-CarrierList-r15,
    idleMeasurementDuration-r15     ENUMERATED {sec10, sec30, sec60,
                                    sec120, sec300}
    ...
}

EUTRA-CarrierList-r15 ::= SEQUENCE (SIZE (1..maxIdleMeasCarriers-r15))
OF CarrierMeasIdleEUTRA-r15
CarrierMeasIdleEUTRA-r15 ::=   SEQUENCE {
    carrierFreq-r15                 ARFCN-ValueEUTRA,
    allowedMeasBandwidth-r15        AllowedMeasBandwidth,
    measurementcycle-r15            MeasCycleSCell-r10,
    cellsToMeasureList-r15          CellsToMeasureList   OPTIONAL   -- Need
OR
}
CellsToMeasureList ::=   SEQUENCE (SIZE (1..maxCellMeasIdle-r15)) OF PhysCellId
maxIdleMeasCarriers-r15   INTEGER ::= 3
maxCellMeasIdle-r15       INTEGER ::= 8
-- ASN1STOP
```

FIG.5

```
-- ASN1START

RRCConnectionRelease-v1320-IEs::=   SEQUENCE {
    resumeIdentity-r13              ResumeIdentity-r13                      OPTIONAL,   -- Need OR
    nonCriticalExtension            RRCConnectionRelease-v15xy-IEs OPTIONAL
}

RRCConnectionRelease-v15xy-IEs::=   SEQUENCE {
    idleModeMeasurementConfig-r15   IdleModeMeasurementConfig-r15           OPTIONAL,   -- Need ON
    nonCriticalExtension            SEQUENCE {}                             OPTIONAL
}

-- ASN1STOP
```

FIG.6

```
-- ASN1START
IdleModeMeasurementConfig-r15 ::=   SEQUENCE {
    idleMeasuredCarriersEUTRA-r15       EUTRA-CarrierList-r15,
    idleMeasurementDuration-r15         ENUMERATED {sec10, sec30, sec60, sec120, sec300}
    ...
}

EUTRA-CarrierList-r15 ::=   SEQUENCE (SIZE (1..maxIdleMeasCarriers-r15))
                            OF CarrierMeasIdleEUTRA-r15
CarrierMeasIdleEUTRA ::=    SEQUENCE {
    carrierFreq-r15             ARFCN-ValueEUTRA,
    allowedMeasBandwidth-r15    AllowedMeasBandwidth,
    measurementcycle-r15        MeasCycleSCell-r10,
    cellsToMeasureList-r15      CellsToMeasureList           OPTIONAL,    -- Need OR
    qualityThreshold            CHOICE {
        rsrpThreshold-r15           RSRP-Range,
        rsrqThreshold-r15           RSRQ-Range-r13,
        rssinrThreshold-r15         RS-SINR-Range-r13
    }                                                        OPTIONAL,    -- Need OR
    measurementQuantities-r15   SEQUENCE {
        rsrp                        BOOLEAN,
        rsrq                        BOOLEAN,
        rssinr                      BOOLEAN
    }                                                        OPTIONAL,    -- Need OR
}

CellsToMeasureList ::=      SEQUENCE (SIZE (1..maxCellMeasIdle-r15)) OF PhysCellId
maxIdleMeasCarriers-r15     INTEGER ::= 3
maxCellMeasIdle-r15         INTEGER ::= 8
-- ASN1STOP
```

FIG. 7

MEASUREMENT FOR FAST CELL ACCESS

CROSS REFERENCE TO RELATED APPLICATION

This patent application is a U.S. National Stage application of International Patent Application Number PCT/EP2018/081336 filed Nov. 15, 2018, which is hereby incorporated by reference in its entirety, and claims priority to U.S. 62/587,560 filed Nov. 17, 2017 which is hereby incorporated by reference in its entirety.

BACKGROUND

Technical Field

The exemplary and non-limiting embodiments relate generally to communications and, more particularly, to access by a user equipment (UE) to a network.

Embodiments of the invention generally relate to wireless or cellular communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or 5G radio access technology and/or new radio (NR) access technology. Some embodiments may generally relate to LTE/NR and, more specifically, to enabling fast cell access (such as a small cell for example) from idle or inactive state to connected state, for example.

The following abbreviations that may be found in the specification and/or the drawing figures are defined as follows:

| | |
|---|---|
| CA | Carrier Aggregation |
| CF | Carrier Frequency |
| CRS | Cell specific Reference Signal |
| CSI-RS | Channel State Information Reference Signal |
| DC | Dual Connectivity |
| eNB | E-UTRAN Node B |
| euCA | Enhanced utilization of carrier aggregation |
| E-UTRA | Evolved Universal Mobile Telecommunication System (UMTS) Terrestrial Radio Access |
| E-UTRAN | Evolved UTRAN |
| FDD | Frequency Division Duplex |
| HetNet | Heterogenous Network |
| MDT | Minimization of Drive Tests |
| MO | Mobile Originated |
| MT | Mobile Terminated |
| NW | Networks |
| PCell | Primary cell |
| QoS | Quality of Service |
| RAT | Radio Access Technology |
| Rel. | Release |
| RRC | Radio resource control |
| RSRP | Reference Signal Received Power |
| RSRQ | Reference Signal Received Quality |
| RS-SINR | Reference Signal - Signal to Interference Noise Ratio |
| SCell | Secondary cell |
| TDD | Time Division Duplex |
| UE | User Equipment |
| WLAN | Wireless Local Area Network |
| WID | Work Item description |
| WiFi | wireless local area networking with devices based on the IEEE 802.11 standards |

SUMMARY

In an example aspect of the invention, there is a method comprising: measuring, by a user equipment, a communication quality with at least one measured cell of a communication node while the user equipment is in an idle or inactive state; upon the user equipment transitioning to a connected state, determining by the user equipment that the communication quality with the at least one measured cell is larger than a threshold; and transmitting information comprising a measurement report from the user equipment to a network equipment that the at least one measured cell meets the threshold for the network equipment to signal the user equipment to configure communication with the at least one measured cell without further measurements from the user equipment.

A further example embodiment is a method comprising the method of the previous paragraph, wherein the measurement report comprises a duration of time in which the at least one measured cell has met the threshold; wherein the at least one measured cell comprises a secondary cell, and wherein the communication quality is based on a measurement reliability condition; wherein the information is based on a measurement report of a cell of the at least one measured cell with a best measurement reliability condition; wherein the measurement reliability condition is determined based on a quality condition preconfigured by the network for the user equipment; wherein the quality condition is preconfigured for the user equipment by the network via one of dedicated or broadcast signaling; wherein the duration of time is related to a reliability condition of the measurement report comprising a duration of time since a last measurement of the cell; wherein the duration of time is since a last measurement when the cell was not fulfilling the configured quality condition; wherein upon the user equipment transitioning to the connected state there is starting, by the user equipment, a timer to record the duration of time that the communication quality with the at least one measured cell has met the threshold; wherein the timer is configured by the network for the user equipment; and wherein the timer is stopped based on one of the user equipment leaving the idle or inactive state, and based on the user equipment not obtaining measurements during the length of time.

A non-transitory computer-readable medium storing program code, the program code executed by at least one processor to perform at least the method as described in the paragraphs above.

In yet another example aspect of the invention, there is an apparatus, such as a user equipment or mobile equipment apparatus, comprising: means for measuring, by a user equipment, a communication quality with at least one measured cell of a communication node while the user equipment is in an idle or inactive state; means, upon the user equipment transitioning to a connected state, for determining by the user equipment that the communication quality with the at least one measured cell is larger than a threshold; and means for transmitting information comprising a measurement report from the user equipment to a network equipment that the at least one measured cell meets the threshold for the network equipment to signal the user equipment to configure communication with the at least one measured cell without further measurements from the user equipment.

A further example embodiment is an apparatus comprising the apparatus of the previous paragraph, wherein the measurement report comprises a duration of time in which the at least one measured cell has met the threshold; wherein the at least one measured cell comprises a secondary cell, and wherein the communication quality is based on a measurement reliability condition; wherein the information is based on a measurement report of a cell of the at least one measured cell with a best measurement reliability condition; wherein the measurement reliability condition is determined based on a quality condition preconfigured by the network for the user equipment; wherein the quality condition is preconfigured for the user equipment by the network via one of dedicated or broadcast signaling; wherein the duration of time is related to a reliability condition of the measurement report comprising a duration of time since a last measurement of the cell; wherein the duration of time is since a last measurement when the cell was not fulfilling the configured quality condition; wherein upon the user equipment transitioning to the connected state there is means for starting, by the user equipment, a timer to record the duration of time that the communication quality with the at least one measured cell has met the threshold; wherein the timer is configured by the network for the user equipment; and wherein the timer is stopped based on one of the user equipment leaving the idle or inactive state, and based on the user equipment not obtaining measurements during the length of time.

In another example aspect of the invention, there is an apparatus comprising: means for measuring, by a user equipment, a communication quality with at least one measured cell of a communication node while the user equipment is in an idle or inactive state; means, upon the user equipment transitioning to a connected state, for determining by the user equipment that the communication quality with the at least one measured cell is larger than a threshold; and means for transmitting information comprising a measurement report from the user equipment to a network equipment that the at least one measured cell meets the threshold for the network equipment to signal the user equipment to configure communication with the at least one measured cell without further measurements from the user equipment.

In accordance with the example embodiments as described in the paragraph above, at least the means for measuring, determining, and transmitting comprises a network interface, and computer program code stored on a computer-readable medium and executed by at least one processor.

A further example embodiment is an apparatus comprising the apparatus of the previous paragraph, wherein the measurement report comprises a duration of time in which the at least one measured cell has met the threshold; wherein the at least one measured cell comprises a secondary cell, and wherein the communication quality is based on a measurement reliability condition; wherein the information is based on a measurement report of a cell of the at least one measured cell with a best measurement reliability condition; wherein the measurement reliability condition is determined based on a quality condition preconfigured by the network for the user equipment; wherein the quality condition is preconfigured for the user equipment by the network via one of dedicated or broadcast signaling; wherein the duration of time is related to a reliability condition of the measurement report comprising a duration of time since a last measurement of the cell; wherein the duration of time is since a last measurement when the cell was not fulfilling the configured quality condition; wherein upon the user equipment transitioning to the connected state there is means for starting, by the user equipment, a timer to record the duration of time that the communication quality with the at least one measured cell has met the threshold; wherein the timer is configured by the network for the user equipment; and wherein the timer is stopped based on one of the user equipment leaving the idle or inactive state, and based on the user equipment not obtaining measurements during the length of time.

In another example aspect of the invention, there is a method comprising: receiving by a network equipment information comprising a measurement report from a user equipment which is waking from an idle or inactive state and seeking access to a serving cell communication, wherein the measurement report comprises an identification of a cell which met a communication quality threshold with the user equipment while the user equipment was in the idle or inactive state; comparing the measurement report received by the network equipment from the user equipment to a predetermined threshold value, wherein based on the comparing the network equipment is caused to configure communication with the cell without further measurements from the user equipment, wherein based on the comparing the network equipment is caused to configure communication with the cell without further measurements from the user equipment; and sending a signal from the network equipment to the user equipment with instructions for the user equipment to configure communication with the cell without further measurements from the user equipment.

A further example embodiment is a method comprising the method of the previous paragraph, wherein the cell comprises a secondary cell, and wherein the communication quality threshold is based on a measurement reliability condition; wherein based on the measurement report indicating that a reference signal received power of the cell is above a quality threshold associated with a timer, the method comprising signaling the user equipment to configure the communication with the at least one measured cell without further measurements from the user equipment, wherein the signaling is causing a starting value 0 of the timer, and wherein based on the measurement report indicating that a reference signal received power of the cell is below a quality threshold associated with a timer, the user equipment is caused to stop and reset the timer; wherein the information is based on a measurement report of a cell with a best measurement reliability condition; wherein the measurement reliability condition is based on a quality condition preconfigured by the network for the user equipment; wherein the quality condition is preconfigured for the user equipment by the network via one of dedicated or broadcast signaling; wherein the information comprises an indication of a duration of time of the measurement reliability condition since a last measurement of the cell; and wherein at least the duration of time of the measurement reliability condition since the last measurement of the cell is for use by the network to determine to configure a connection setup for the user equipment with the secondary cell without further measurements from the user equipment.

A non-transitory computer-readable medium storing program code, the program code executed by at least one processor to perform at least the method as described in the paragraphs above.

In an example aspect of the invention, there is an apparatus, such as a network side apparatus or base station apparatus, comprising: at least one processor; and at least one memory including computer program code, where the at least one memory and the computer program code are configured, with the at least one processor, to cause the apparatus to at least: receive by a network equipment information comprising a measurement report from a user equipment which is waking from an idle or inactive state and seeking access to a serving cell communication, wherein the measurement report comprises an identification of a cell which met a communication quality threshold with the user equipment while the user equipment was in the idle or inactive state; comparing the measurement report received by the network equipment from the user equipment to a predetermined threshold value, wherein based on the comparing the network equipment is caused to configure communication with the cell without further measurements from the user equipment, wherein based on the comparing the network equipment is caused to configure communication with the cell without further measurements from the user equipment; and send a signal from the network equipment to the user equipment with instructions for the user equipment to configure communication with the cell without further measurements from the user equipment.

A further example embodiment is an apparatus comprising the apparatus of the previous paragraph, wherein the cell comprises a secondary cell, and wherein the communication quality threshold is based on a measurement reliability condition; wherein based on the measurement report indicating that a reference signal received power of the cell is above a quality threshold associated with a timer, the method comprising signaling the user equipment to configure the communication with the at least one measured cell without further measurements from the user equipment, wherein the signaling is causing a starting value 0 of the timer, and wherein based on the measurement report indicating that a reference signal received power of the cell is below a quality threshold associated with a timer, the user equipment is caused to stop and reset the timer; wherein the information is based on a measurement report of a cell with a best measurement reliability condition; wherein the measurement reliability condition is based on a quality condition preconfigured by the network for the user equipment; wherein the quality condition is preconfigured for the user equipment by the network via one of dedicated or broadcast signaling; wherein the information comprises an indication of a duration of time of the measurement reliability condition since a last measurement of the cell; and wherein at least the duration of time of the measurement reliability condition since the last measurement of the cell is for use by the network to determine to configure a connection setup for the user equipment with the secondary cell without further measurements from the user equipment.

In another example aspect of the invention, there is an apparatus comprising: means for receiving by a network equipment information comprising a measurement report from a user equipment which is waking from an idle or inactive state and seeking access to a serving cell communication, wherein the measurement report comprises an identification of a cell which met a communication quality threshold with the user equipment while the user equipment was in the idle or inactive state; means for comparing the measurement report received by the network equipment from the user equipment to a predetermined threshold value, wherein based on the comparing the network equipment is caused to configure communication with the cell without further measurements from the user equipment, wherein based on the comparing the network equipment is caused to configure communication with the cell without further measurements from the user equipment; and means for sending a signal from the network equipment to the user equipment with instructions for the user equipment to configure communication with the cell without further measurements from the user equipment.

In accordance with the example embodiments as described in the paragraph above, at least the means for receiving, comparing, and sending comprises a network interface, and computer program code stored on a computer-readable medium and executed by at least one processor.

A further example embodiment is an apparatus comprising the apparatus of the previous paragraph, wherein the cell comprises a secondary cell, and wherein the communication quality threshold is based on a measurement reliability condition; wherein based on the measurement report indicating that a reference signal received power of the cell is above a quality threshold associated with a timer, the method comprising signaling the user equipment to configure the communication with the at least one measured cell without further measurements from the user equipment, wherein the signaling is causing a starting value 0 of the timer, and wherein based on the measurement report indicating that a reference signal received power of the cell is below a quality threshold associated with a timer, the user equipment is caused to stop and reset the timer; wherein the information is based on a measurement report of a cell with a best measurement reliability condition; wherein the measurement reliability condition is based on a quality condition preconfigured by the network for the user equipment; wherein the quality condition is preconfigured for the user equipment by the network via one of dedicated or broadcast signaling; wherein the information comprises an indication of a duration of time of the measurement reliability condition since a last measurement of the cell; and wherein at least the duration of time of the measurement reliability condition since the last measurement of the cell is for use by the network to determine to configure a connection setup for the user equipment with the secondary cell without further measurements from the user equipment.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 5, FIG. 6, and FIG. 7 each show an example of ASN.1 in accordance with example embodiments of the invention;

DETAILED DESCRIPTION OF EMBODIMENTS

Figure 1:
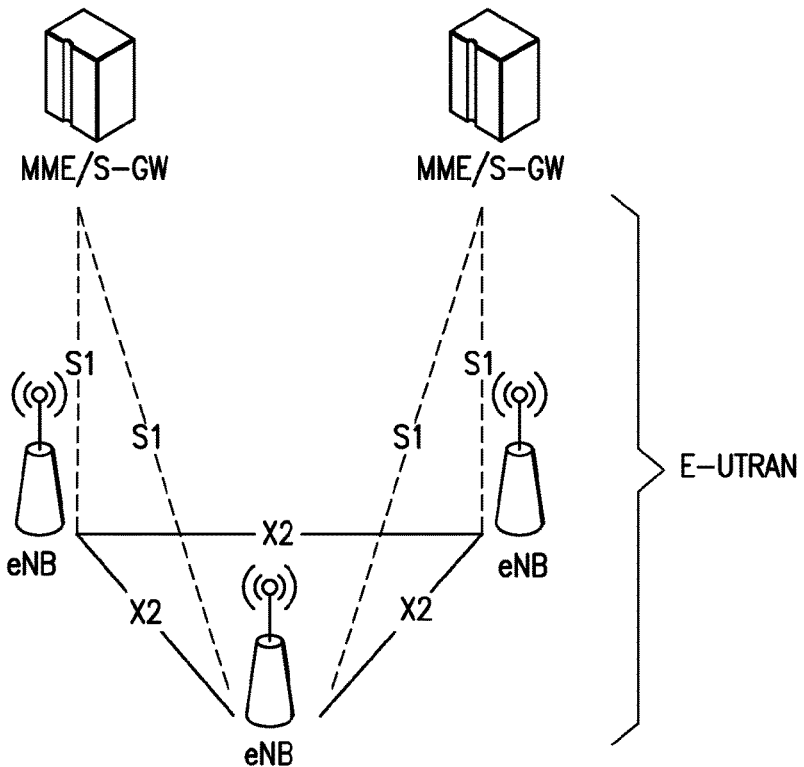
FIG. 1 shows an example of overall architecture of an E-UTRAN system.

FIG. 1 shows an example of overall architecture of an E-UTRAN system. The E-UTRAN system includes eNBs, providing an E-UTRAN user plane (PDCP/RLC/MAC/PHY) and control plane (RRC) protocol terminations towards the UE (not shown in FIG. 1). The eNBs are interconnected with each other by means of an X2 interface. The eNBs are also connected by means of a S1 interface to an EPC (Enhanced Packet Core), more specifically to a MME (Mobility Management Entity) by means of a S1 MME interface and to a Serving Gateway (S-GW) by means of a interface. The S1 interface supports a many-to-many relationship between MMEs/S-GW and eNBs.

Figure 2:
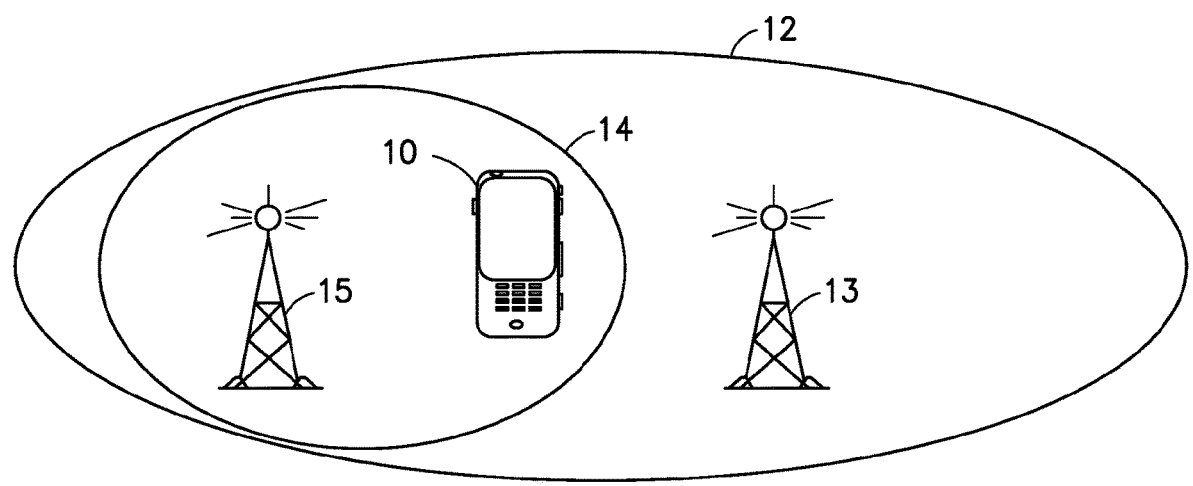
FIG. 2 is a diagram illustrating an example of a User Equipment (UE) and overlapping cells.

Referring also to FIG. 2, a UE 10 may be connected to more than one cell at a same time. In this example the UE 10 is connected to a first cell 12 operated by a base station 13 (such as an eNB for example) and a second 14 operated by another base station (such as an eNB or WiFi/WLAN Access Point for example). The two cells 12, 14 are, thus, at least partially overlapping. The first cell may operate on a licensed band and the second cell may operate on a licensed or unlicensed band for example. The first cell may be either a FDD cell or TDD cell for example. For simplicity, there are just two cells depicted in the scenario for the UE 10 shown in FIG. 2. In other alternate examples any number of cells operating on licensed and/or unlicensed band(s) may be provided to work together for a suitable Carrier Aggregation (CA) and/or Dual Connectivity (DC) and/or aggregation of LTE and another RAT (for example LTE-WLAN aggregation (LWA)), and/or any other suitable type of radio access technology (RAT) aggregation. In one type of example embodiment the cells 12, 14 may be co-located. In another type of example embodiment the two base stations 13 and 15 may be co-located and/or consist of one base station only.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Features as described herein may be used in relation to an LTE-Advanced system. More specifically, features as described herein may be used for LTE Carrier Aggregation (CA) operation including the newly developed feature of Licensed-Assisted Access (LAA), where the SCell may be using unlicensed band for communication with the UE. Please note that features as described herein are not specifically for LAA (unlicensed band operation), but may be used for CA and/or DC and/or LTE-other RAT aggregation, and/or any other suitable RAT aggregation operation in general. In one type of example embodiment the carrier aggregation principle may assume LTE Rel-10/11/12/13 Carrier Aggregation scenario with co-located cells and/or non-collocated cells connected with (close to) ideal backhaul. The secondary cell(s) may be used for supplemental downlink capacity only, or both downlink and uplink capacity.

Figure 3:
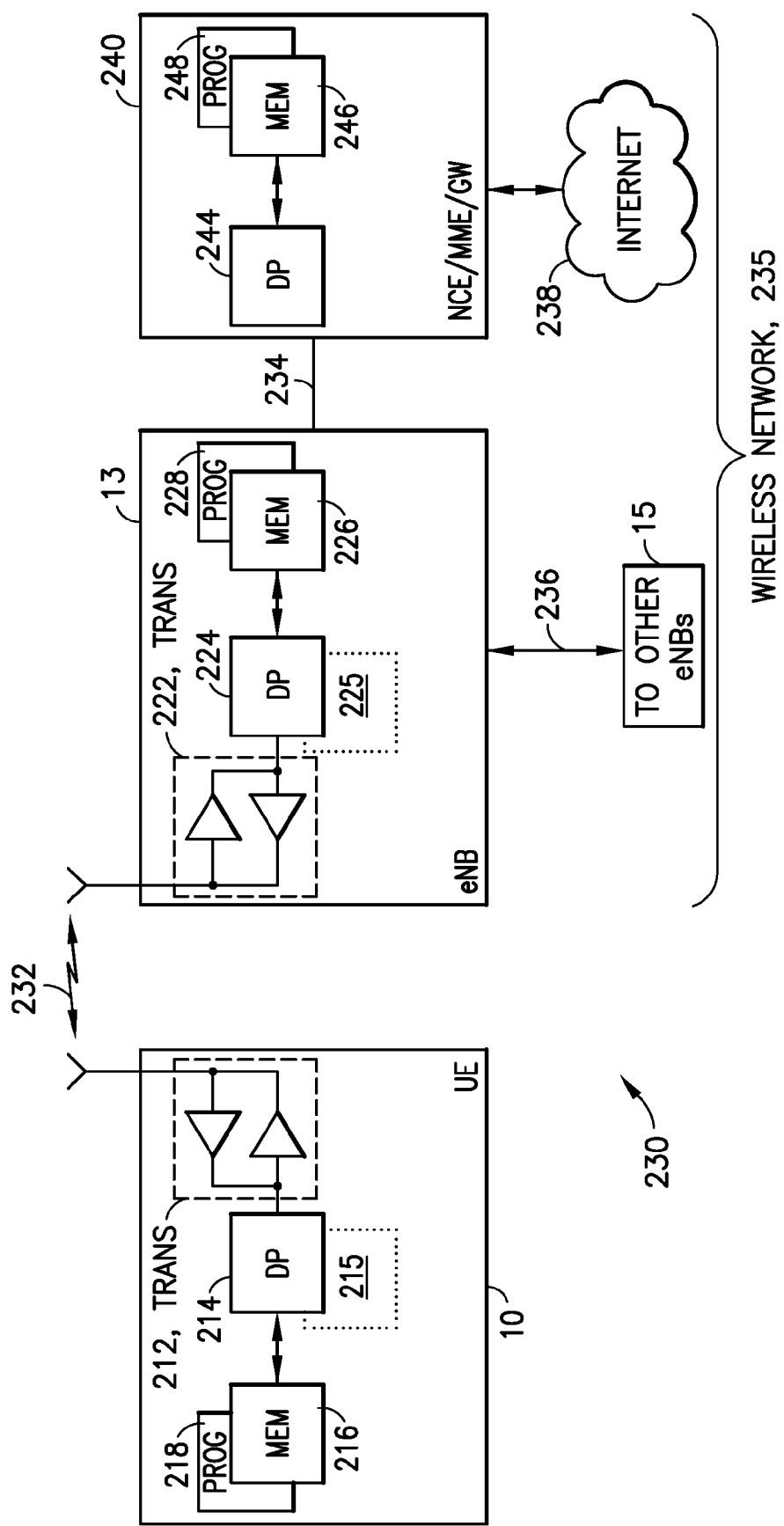
FIG. 3 shows a simplified block diagram of devices which may be configured to perform operations in accordance with some embodiments of the invention.

Referring also to FIG. 3, in the wireless system 230 a wireless network 235 is adapted for communication over a wireless link 232 with an apparatus, such as a mobile communication device which may be referred to as a UE 10, via a network access node, such as a Node B (base station), and more specifically an eNB 13. The network 235 may include a network control element (NCE) 240 that may include MME/S-GW functionality, and which provides connectivity with a network, such as a telephone network and/or a data communications network (e.g., the internet 238).

The UE 10 may include a controller, such as a computer or a data processor (DP) 214, a computer-readable memory medium embodied as a memory (MEM) 216 that stores a program of computer instructions (PROG) 218, and a suitable wireless interface, such as radio frequency (RF) transceiver 212, for bidirectional wireless communications with the eNB 13 via one or more antennas.

The eNB 13 may also include a controller, such as a computer or a data processor (DP) 224, a computer-readable memory medium embodied as a memory (MEM) 226 that stores a program of computer instructions (PROG) 228, and a suitable wireless interface, such as RF transceiver 222, for communication with the UE 10 via one or more antennas. The eNB 13 may be coupled via a data/control path 234 to the NCE 240. The path 234 may be implemented as an interface. The eNB 13 may also be coupled to another eNB via data/control path 236, which may be implemented as an interface.

The NCE 240 may include a controller, such as a computer or a data processor (DP) 244, a computer-readable memory medium embodied as a memory (MEM) 246 that stores a program of computer instructions (PROG) 248.

At least one of the PROGs 218, 228 and 248 is assumed to include program instructions that, when executed by the associated DP, enable the device to operate in accordance with exemplary embodiments of this invention, as will be discussed below in greater detail. That is, various exemplary embodiments of this invention may be implemented at least in part by computer software executable by the DP 214 of the UE 10; by the DP 224 of the eNB 13; and/or by the DP 244 of the NCE 240, or by hardware, or by a combination of software and hardware (and firmware). Base station 15 may have the same type of components as the base station 13.

For the purposes of describing various exemplary embodiments in accordance with this invention the UE 10 and the eNB 13 may also include dedicated processors, for example RRC module 215 and a corresponding RRC module 225. RRC module 215 and RRC module 225 may be constructed so as to operate in accordance with various exemplary embodiments in accordance with this invention.

The computer readable MEMs 216, 226 and 246 may be of any type suitable to the local technical environment and may be implemented using any suitable data storage technology, such as semiconductor based memory devices, flash memory, magnetic memory devices and systems, optical memory devices and systems, fixed memory and removable memory. The DPs 214, 224 and 244 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 212 and 222) may be of any type suitable to the local technical environment and may be implemented using any suitable communication technology such as individual transmitters, receivers, transceivers or a combination of such components.

Features as described herein may be used to send a measurement report by the UE (when transitioning from idle state or inactive state to a connected state for example) containing information for each reported cell (such as on the small cell carrier for example) related to reliability of the measurement. This may be, for example, for how long has the UE measured that the cell has fulfilled a configured quality condition set by the eNB or some other network element (for example, via a dedicated or broadcast signaling). This may allow the receiving eNB to better assess whether the UE reported information can be used for setting up one or more SCells. Although examples described herein make reference to a small cell, it should be understood that features may be used in a cell other than a small cell. The description regarding a small cell(s) is merely an example.

Features as described herein may be used in regard to Long Term Evolution (LTE) and New Radio (NR) and, in particular, to enabling a fast cell access when a UE is transitioning from an idle state (including a suspended state for example) or inactive state to a connected state. However, it should be noted that features as described herein may be used in the future with other types of systems. For example, features may be used in a 5G network and in the NR (New Radio) and in relation with the future base stations of the 5G network, currently called as gNB. In addition, features may be used to enhancing the setup of carrier aggregation (CA), dual connectivity (DC) or both. Features may also be used in regard to the new ongoing LTE Rel-15 Work Item. See for example RP-161036, RP-161035, RP-161730, RP-161734 for further details on the work item (WI), and RP-170805 for the agreed work item description (WID) on enhanced utilization of CA (euCA).

When the UE is in CA or DC mode (CA/DC), it can be connected to two or more cells on separate carrier frequencies at a same time. For example, the UE could be connected to a macro cell and one or more other cells at the same time (such as small cells for example), where the macro cell and the other cell(s) are operating under separate carrier frequencies. When the UE's connection to its serving cell(s) is released or suspended, the UE goes to an idle state or inactive state (idle/inactive) and drops the CA/DC mode because dropping the CA/DC mode saves power by stopping the monitoring of multiple carriers.

Figure 4:
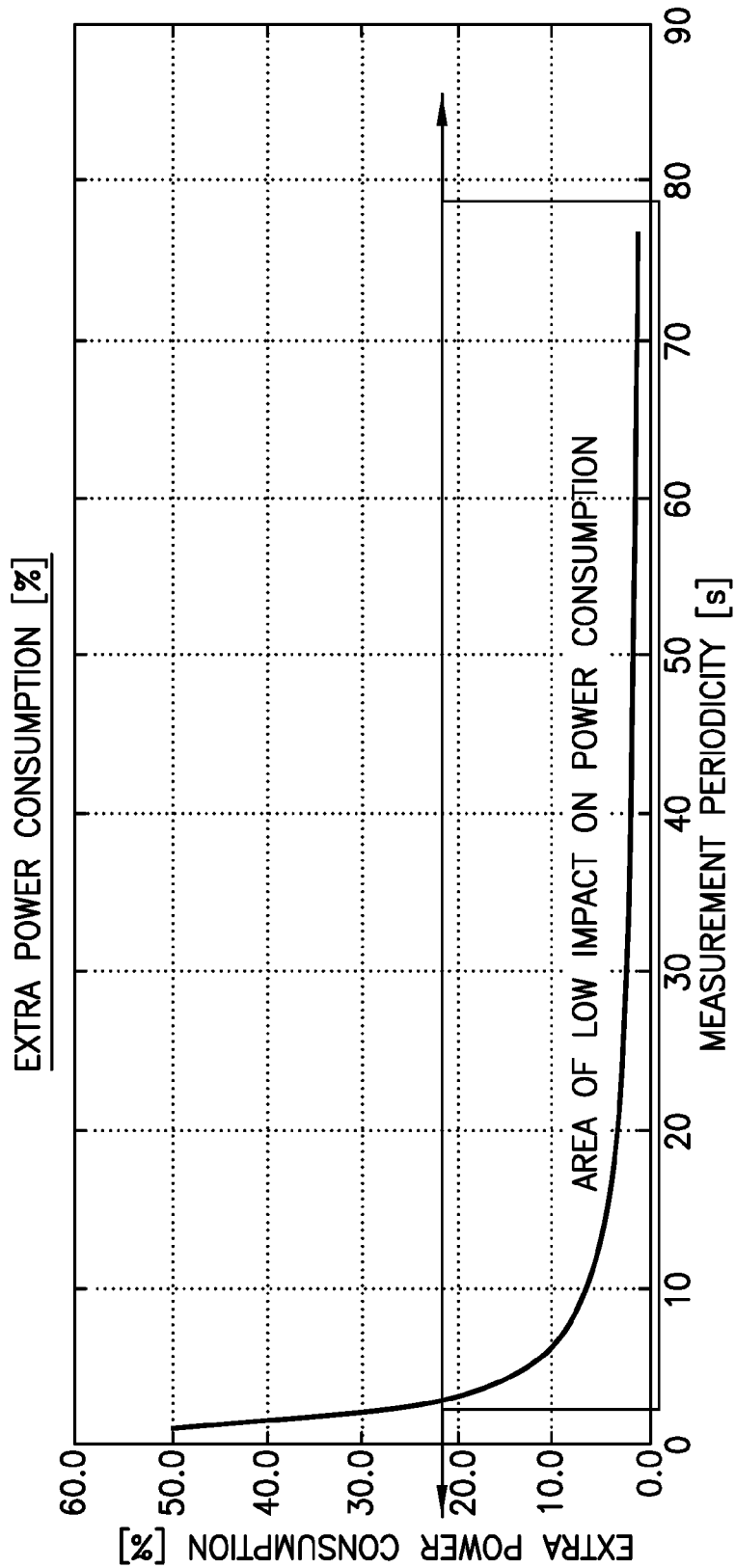
FIG. 4 shows UE extra power consumption as a function of the inter-frequency measurement periodicity.

FIG. 4 illustrates how much extra power consumption is expected in idle due to the inter-frequency measurements for SCells. This considers as a basis for measurement periodicity to be one possible LTE paging cycle (1.28 s). Impact on UE power consumption is considered for different inter-frequency SCell measurements cycles, i.e. for different amounts of time the UE uses for obtaining measurement samples from the monitored inter-frequency carrier(s). The assumption here is that UE can measure both the serving cell and the inter-frequency carrier at the same time and that measuring the inter-frequency carrier increases the power consumption by 50%. As it can be seen from FIG. 4, the less frequently the UE takes the measurement samples, the lower the power consumption impact. The highest power consumption happens if UE takes samples every measurement cycle and in that case that is of a maximum 50%, compared to the IDLE mode power consumption.

In one example embodiment, the measurement report sent by the UE (when transitioning from idle/inactive state to connected state) contains information for each reported cell (for example on the small cell carrier) related to reliability of the measurement such as, for example, for how long the UE-measured cell has fulfilled a configured quality condition set by eNB implicitly (e.g. via the serving cell S-measure value, which indicates when the serving cell considers itself to be good enough to not need neighbor cell measurements, which could be used also cell quality definition for neighbor cells) or explicitly (for example via dedicated or broadcast signalling). This allows the eNB to better assess whether the UE reported information can be used for setting up SCell(s).

In another example embodiment, the UE reports the reliability information just for the best cell on the carrier. In another example embodiment, the UE reports additionally the time since the latest measurement. In another example embodiment, the UE reports additionally the time since the latest measurement when the cell was not fulfilling the quality condition. In another example embodiment, the UE does not report a cell unless a good quality connection has been available for a sufficiently long time (based on measurement configuration from the network). This embodiment moves the decision partly to the UE, though still based on a network determined configuration. Based on the reliability information received from the UE, the network is able to better determine how reliable and stable is the UE's infrequently performed best effort measurement of the cell carrier. For example, if the cell has fulfilled the quality condition for a certain amount of time, such as minutes for example, the result can be considered reliable even though the latest sample may be an older sample, for example 1 minute old. In another example, if the latest measurement sample is only for example 10 seconds old, but that the same cell did not fulfil the quality condition before, the UE is likely moving and, because the cell size may be small (such as with a small cell for example), further measurements may be done before attempting to configure/activate CA or DC in that cell. Thus, the information may also allow the network to estimate how mobile the UE is, similar to for example the existing mobility history reporting. However, here the network may be interested in movement relative to potential target cells, not the macro cell layer where the UE may be typically camping. Thus, the mobility history reporting regarding the macro cell layer is not enough here, as the information conveyed by it does not give necessary information if the UE is not reselecting the cells.

In another example embodiment, such as when the UE is released into an idle or inactive state due to traffic termination for example, the UE may start a timer which can record for how long the cell/small cell is above a quality threshold (for example RSRP>=X dB). This timer may be configured by the network, per cell for example. For example, when a cell fulfils the entry configured condition (e.g. RSRP>X dB), a timer may be started from 0 (zero). It may then be stopped and reset if a configured leaving condition is fulfilled (such as RSRP<Y dB for example). In an example embodiment, if the UE does not obtain any measurements for a configured timer period T, the timer may be stopped and reset.

In one example when the connection is established or resumed, and the UE sends the measurement information, the UE might report only the cells that fulfil the condition (for example at least one of the cell/small cell is above a quality threshold (e.g. RSRP>=X dB) or the cell/small cell is under a quality threshold (e.g. RSRP<=Y dB)) (while the timer is running for example) and include information for how long they have fulfilled the condition.

When traffic is initiated (MO/MT), the UE may report to network the measurement report with the measurements done while in idle/inactive state, with the additional information on how long the UE stayed in a particular cell (fulfilling the configured quality criteria).

Figure 9:
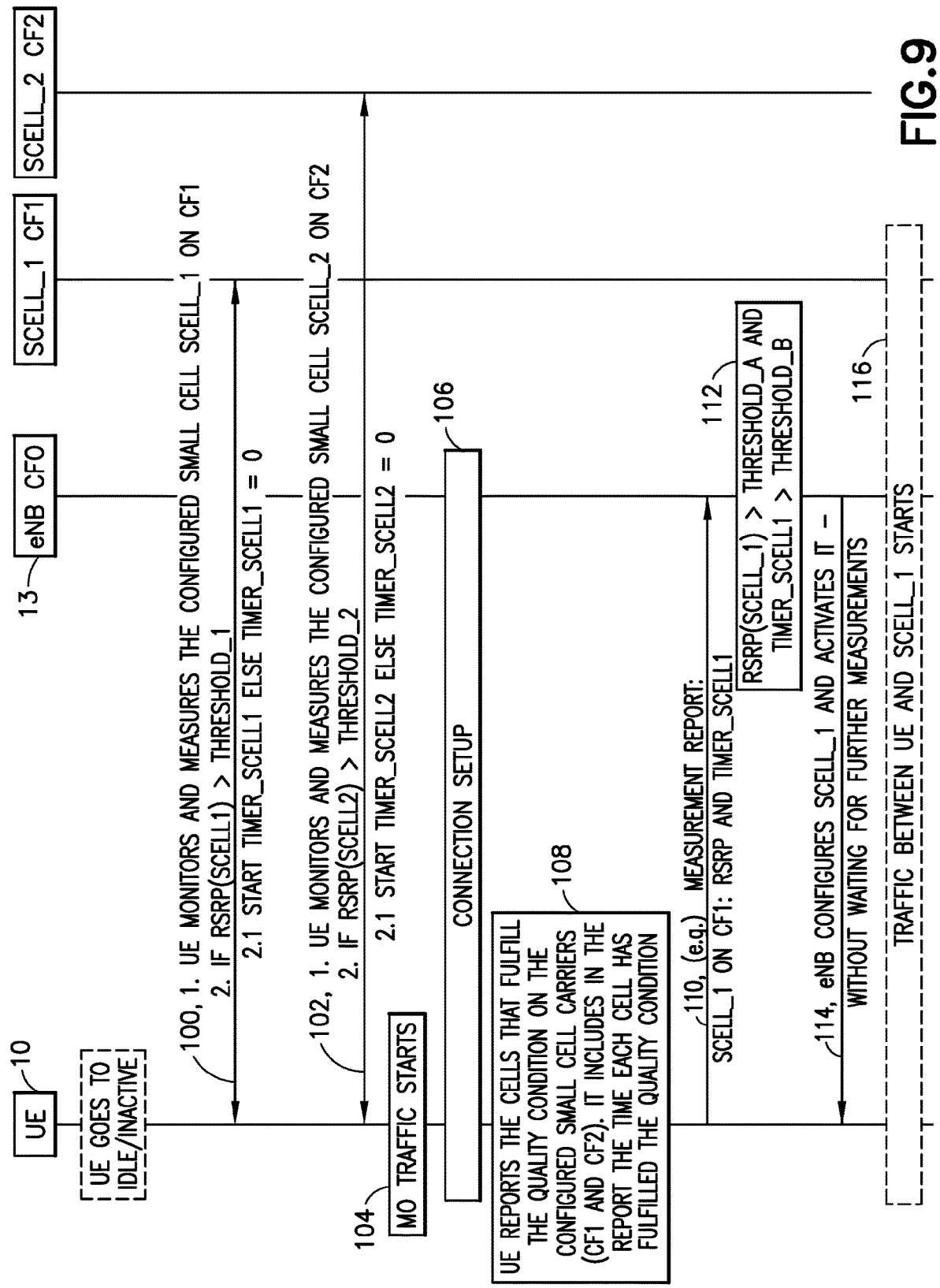

This may provide information/knowledge on how stable the situation is between the UE and the non-Primary cell; for example derived from the new measurement report. When the UE sends its measurement report to the eNB or other network element, if the cell has been changing recently (such as the UE is moving for example), the best effort measurement is less reliable than if the UE has been in the same cell for some time, for example for minutes. An example of this is shown in FIG. 9. The eNB may make more use of the UE's best effort idle state measurement results of cells. If the measured cell has fulfilled the quality condition for a longer amount of time, there is very small risk in configuring the cell as for the UE right away compared to the situation where the cell has been only recently detected by the UE.

Even though LTE was used to exemplify the proposed method, it should not be regarded as the only way to implement it. LTE was used as an example, but in a similar way, also other radio technologies could be used as example. For example 5G or new radio (NR) or WLAN or any other radio technology where such approach may be applied or applicable.

In RAN2#99bis, it was agreed that the UE measurement configuration for IDLE could be given in either SIB5 or RRCConnectionRelease, as shown below:
1 The indication for which carrier(s) UE could do the IDLE measurements is included in SIB5 and dedicated RRC signaling (including the valid timer). FFS the value range of the timer.
2 UE indicates the availability of inter-frequency measurements in RRCConnectionSetupComplete or RRC-ConnectionResumeComplete For example, in LTE the RRC information element (IE) SystemInformationBlockType5 (SIB5) contains neighbor cell related information for inter-frequency cell-reselection i.e. the information about neighbor E-UTRA frequencies. In this case, SIB5 includes neighbor cell list, carrier frequency, cell reselection priority, threshold used by the UE when reselecting a higher/lower priority frequency than the current serving frequency etc. It also contains a list of black-listed inter-frequency neighboring cells.

When SIB5 is used for indicating IDLE mode measurements are desired, the information is broadcast to all UEs and, therefore, could be potentially used by UEs that do not need to do so. In addition, the information should be compact enough to avoid lot of overhead, yet provide enough information to allow UE and network to benefit from the measurements. Also, the UE actions upon receiving the measurements should be specified, including what happens when the (already agreed) validity timer for the measurements expires. Therefore, the following questions are still not discussed in 3GPP:
  To which UEs does the SIB5 configuration apply?
  Exactly what information is necessary to broadcast?
  When receiving the broadcast information, what does the UE do?
  After the validity timer expires, what happens to the UE measurements?

SIB applicability to UEs: Only UEs that are capable of the Rel-15 or later functionality will do anything with the broadcast information. However, depending on use case, this could still prove to be significant number of UEs, with possibly some impact to UE battery life if the number of measurement periods are very large. Therefore, the UE measurement time could be limited via some means to ensure good UE power consumption, while still receiving benefits from the IDLE mode measurements.

Because measurements done based on SIB5 may affect a large number of UEs, one way to limit this is to limit the UEs that apply the rules. For other SIB-related actions, this is typically done randomly (e.g. with ACB or load re-distribution), but that would simply randomize the benefits and likely not help system performance. Even having all UEs obey the procedures would likely still provide better benefits, as at least then the UEs could have the best possibility to utilize CA. Another possibility would be that only UEs that have already been in a CONNECTED state might utilize the information, to ensure that only certain UEs do the measurements (which would help to also mitigate any power consumption issues arising from the new procedures).

An efficient way to limit UE power consumption may be to only have UEs that have been released from a CONNECTED state to an IDLE state do measurements based on SIB5. Alternatively, UEs could be doing (much) more restricted measurements based on SIB5 broadcast. For example, the SIB5 broadcast might only indicate a few cells (e.g. 8) per carrier frequency, and the maximum number of measured carriers could also be limited such as up to three carriers for example (i.e. the typical LTE maximum measurement capability for inter-frequency carriers in IDLE mode). In one example embodiment the information that can be broadcast in SIB5 should be limited to at most 3 inter-frequencies and at most 8 cells per carrier frequency. An example of ASN.1 for this is shown in FIG. 5.

Compared to the UE actions based on the SIB5 broadcast, the situation for the UE and the network is slightly different when conveying the information to UE using the RRC message RRCConnectionRelease. The UE capabilities are known at the time of sending the message by the eNB and the eNB has an active signaling connection with the UE, thus being able to provide much more information than would typically ever be broadcast. Thus, it would even be possible for the UE to retain the whole CA configuration it has used prior to being moved to IDLE if so desired. Like with MDT logged measurements, the information could also be given to the UE prior to the connection release.

There are far fewer limitations to information given to the UE prior to RRCConnectionRelease compared to SIB5 broadcast. This is somewhat similar to the suspension of RRC connection, which was also agreed to be covered in RAN2#99bis agreements. Since the UE already stores most of the Access Stratum (AS) context and RRC configuration, that could be extended to this case as well. The UE could be provided with a much more detailed measurement configuration, or the previous CA configuration could even be used partly or fully for measurements while within the same serving cell.

Doing measurements based on previous CA configuration while within the same serving cell would provide a good basis for CA operation. The UE can be provided with a "CA measurement configuration" within RRCConnectionRelease that is different from SIB5 configuration, and which overrides any SIB5 configurations. An example of ASN.1 for this is shown in FIG. 6.

In some cases, the UE is not performing or is unable to perform the same measurements during the IDLE mode as it would during the CONNECTED mode. For example, measurements based on neighbor cell reference signals for example CSI-RS may not seem reasonable as they require both a serving cell time reference (which could come from serving cell) as well as knowledge that the CSI-RS are being transmitted; all of which might be dynamic. Therefore, the simplest may be to only enable RSRP, RSRQ and RS-SINR based on CRS to be reported. Thus, in one example embodiment only CRS-based measurements (RSRP/RSRQ/RS-SINR) are supported for IDLE mode measurements. The network might also only be interested in certain metric, such as RSRP only for example. Therefore, it may be possible to signal which of the measurement quantities are being requested from the UE.

In one example embodiment the network may indicate which measurement quantities out of RSRP, RSRQ and RS-SINR UE should report for IDLE mode measurements. Since the UE measurement cycle is also infrequent it may also be good to understand how much the measurements vary over time. This may also then tell the eNB whether the UE is for example stationary or semi-stationary, or moving; which may affect the policy of setting up CA or DC or multi-connectivity (MC). For example, stationary UEs may have better gains from CA/DC/MC in good coverage. Therefore, the UE may be requested to also indicate the time or duration when the measurements have been within given bounds; in a similar manner as for example a time-to-trigger is used in CONNECTED mode measurements. Hence, when doing IDLE mode measurements the UE may, for example, maintain the time that records how long a measured cell has been above a threshold value (for example RSRP>=X dB). This may then be reported to network, per cell, to indicate whether the recent measurements have been stable.

In one type of example, the UE can be requested to log the time during which a measured cell has been above a threshold value (such as similar to measurement event A1 for example from LTE or some other measurement event similar to A1). Further, the UE may be requested to only report cells that fulfill the given condition (such as because the eNB would only use good enough cells for CA/DC/MC purpose for example). As an example, the ASN.1 for this is shown in FIG. 7 showing these restrictions to IDLE mode measurements.

Figure 8:
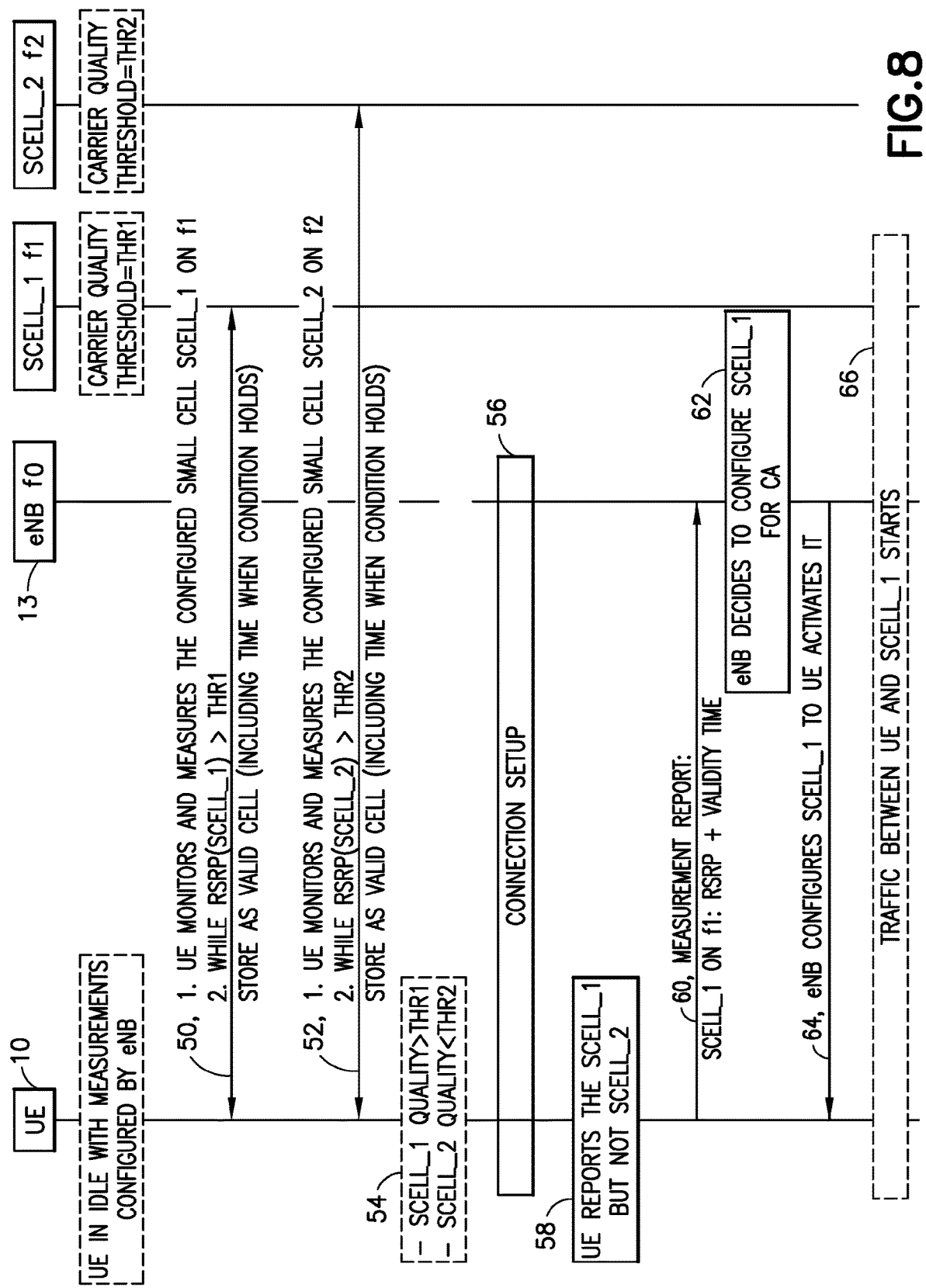
FIG. 8 and FIG. 9 each show an illustration of operations in accordance with example embodiments of the invention.

Referring also to FIG. 8, an example of restricting IDLE mode measurements by candidate cell quality is shown. In this example, when the UE 10 is in an idle state, the UE may monitor and measure the configured cell(s), which are in this figure referred to as SCells despite not yet being configured to the UE as SCells; in this case SCell_1 and SCell_2 as shown by 50 and 52. At 50 the UE monitors and measures the configured small cell SCell_1 on frequency $f_1$, and then stores the cell as a valid cell, including time when a condition holds, if the condition RSRP (SCell_1) is greater than a threshold (Thr1). At 52 the UE monitors and measures the configured small cell SCell_2 on frequency $f_2$, and then stores the cell as a valid cell, including time when a condition holds, if the condition RSRP (SCell_2) is greater than a threshold (Thr2). In this example, as illustrated by block 54, cell SCell_1 meets its threshold, but cell SCell_2 does not meet its threshold. After user traffic (for example mobile originated (MO) traffic) starts, there is a connection setup 56 between the eNB 13 and the UE 10. As illustrated by block 58, the UE 10 may then create a report of the cell (SCell_1) that fulfilled the quality condition/threshold on the configured small cell carriers, and then send the report to the eNB as indicated by 60. The measurement report in this example would not include SCell_2. The UE may include in the report the time duration each cell has fulfilled the quality condition.

As indicated by 62 the network, such as the eNB 13, may compare information from the report to determine that the SCell_1 meets the condition for CA, and signal 64 the UE for configuring communication with the SCell_1 without waiting for further measurements. Traffic between the UE and the determined secondary cell (SCell_1) may then start as indicated by 66.

Referring back to FIG. 9, in this example, when the UE is in an idle state, the UE may monitor and measure the configured cell(s); in this case SCell_1 and SCell_2 as shown by 100 and 102. After user traffic (e.g. mobile originated (MO) traffic) starts 104, there is a connection setup 106 between the eNB 13 and the UE 10. As illustrated by block 108, the UE 10 may then create a report of the cells that fulfill the quality condition on the configured cell carriers (CF1 and CF2 in this example), and then sends the report to the eNB as indicated by 110. The UE may include in the report the time each cell has fulfilled the quality condition.

As indicated by 112 the network, such as the eNB 13, may compare information from the report to predetermined thresholds, and signal 114 the UE for configuring communication with one or more predetermined ones of the SCell(s) without waiting for further measurements. Traffic between the UE and the determined secondary cell(s) may then start as indicated by 116.

With features as described herein, limited additional UE measurements may be introduced during a idle/inactive mode of the UE to enable faster cell setup (e.g. in CA or DC sense) after connection establishment/resume such as for enCA for example. Features as described herein may be used to provide a balance in the amount of measurements the UE does versus power use while in that power saving state. Thus, features as described herein may be used to make the most out of infrequent cell (or the cell carrier) measurements performed by the UE in the idle/inactive state with the least amount of power use. Unlike conventional measurement reports, the information used for the UE's measurement report may be old or obsolete in regard to standard connection measurements used by the eNB and UE. The value or usefulness of these old measurement result may depend on whether the UE is moving and, if it is moving, how fast it is moving.

Conventionally, a UE in a "connected" state may be in e.g. a small cell layer (or dual connected) to obtain better performance, and the UE in a idle/inactive state may be in the macro layer to reduce the measurement and signaling burden associated with cell reselections. Conventionally, a UE would not continue inter-frequency measurements frequently for longer periods of time. With features as described herein, relevant information from the UE may be provide to the Primary Cell with a new type of measurement report when MO/MT traffic is initiated in order to achieve a fast cell access.

Figure 10:
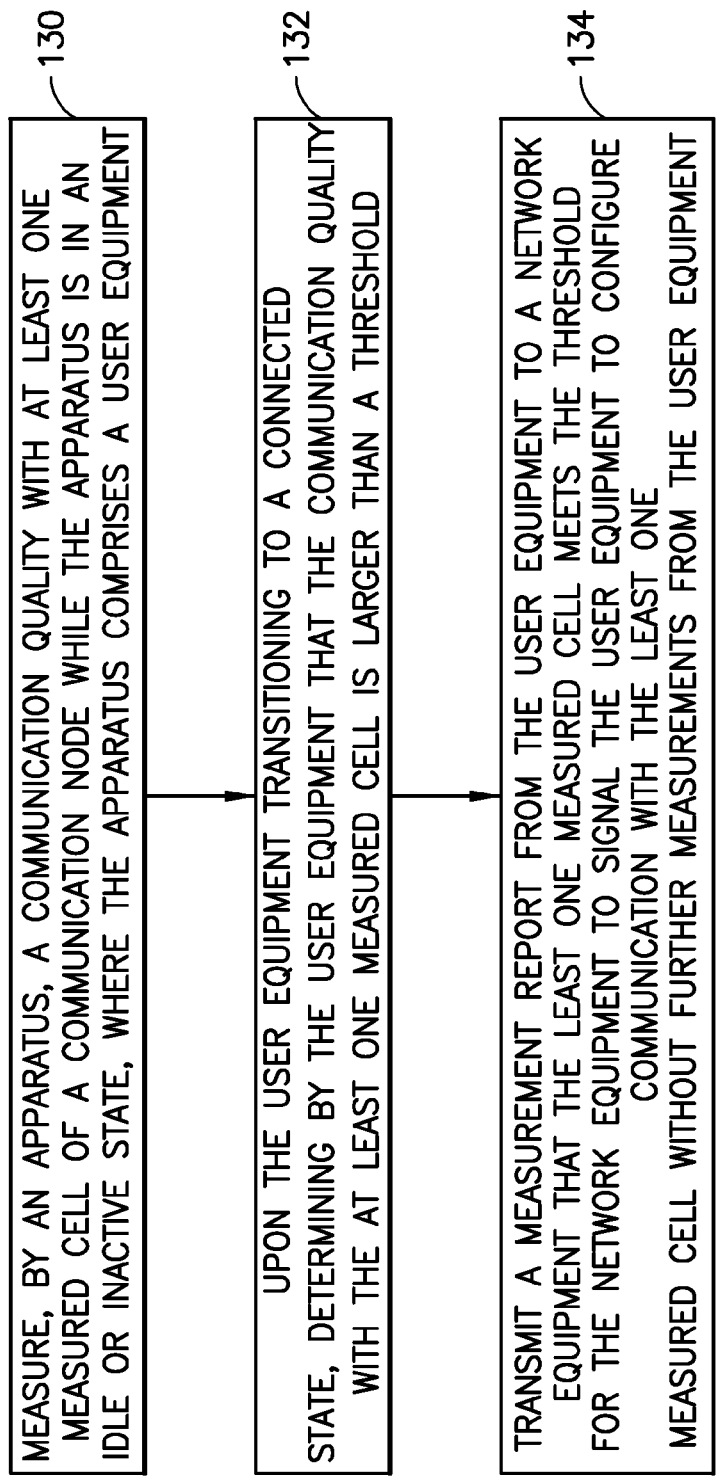
FIG. 10 and FIG. 11 each show a method in accordance with some embodiments which may be performed by an apparatus.

As illustrated by the example in FIG. 10, an example method may comprise measuring, by a user equipment such as the UE 10 as in FIG. 3, a communication quality with at least one measured cell of a communication node while the user equipment is in an idle or inactive state as illustrated by block 130; upon the user equipment transitioning to a connected state (due to e.g. mobile originated (MO) activity of the user equipment), determining by the user equipment that the communication quality with the cell meets a threshold as illustrated by block 132; and transmitting a measurement report from the user equipment to a network equipment that the cell meets the threshold for the network equipment to signal the user equipment to configure communication with the cell without further measurements from the user equipment as illustrated by block 134.

In accordance with the example embodiments as described in the paragraphs above, the user equipment may configure the measurement report with a duration of time in which the cell has met the threshold.

In accordance with the example embodiments as described in the paragraphs above, wherein the at least one measured cell comprises a secondary cell, and wherein the communication quality is based on a measurement reliability condition.

In accordance with the example embodiments as described in the paragraphs above, wherein the information is based on a measurement report of a cell of the at least one measured cell with a best measurement reliability condition.

In accordance with the example embodiments as described in the paragraphs above, wherein the measurement reliability condition is determined based on a quality condition preconfigured by the network for the user equipment.

In accordance with the example embodiments as described in the paragraphs above, wherein the quality condition is preconfigured for the user equipment by the network via one of dedicated or broadcast signaling.

In accordance with the example embodiments as described in the paragraphs above, wherein the duration of time is related to a reliability condition of the measurement report comprising a duration of time since a last measurement of the cell.

In accordance with the example embodiments as described in the paragraphs above, wherein the duration of time is since a last measurement when the cell was not fulfilling the configured quality condition.

In accordance with the example embodiments as described in the paragraphs above, wherein upon the user equipment transitioning to the connected state there is starting, by the user equipment, a timer to record the duration of time that the communication quality with the at least one measured cell has met the threshold.

In accordance with the example embodiments as described in the paragraphs above, wherein the timer is configured by the network for the user equipment.

In accordance with the example embodiments as described in the paragraphs above, wherein the timer is stopped based on one of the user equipment leaving the idle or inactive state, and based on the user equipment not obtaining measurements during the length of time.

A non-transitory computer-readable medium (MEM 216 as in FIG. 3) storing program code (PROG 218 as in FIG. 3), the program code executed by at least one processor (DP 214 and/or RRC Module 215 as in FIG. 3) to perform the operations as at least described in the paragraphs above.

In accordance with an example embodiment of the invention as described above there is an apparatus comprising: means for measuring (MEM 216, PROG 218, DP 214 and/or RRC Module 215 as in FIG. 3), by a user equipment (UE 10 as in FIG. 3), a communication quality with at least one measured cell of a communication node (eNB 13 as in FIG. 3) while the user equipment (UE 10 as in FIG. 3) is in an idle or inactive state; means, upon the user equipment (UE 10 as in FIG. 3) for transitioning (radio frequency (RF) transceiver 212, MEM 216, PROG 218, DP 214 and/or RRC Module 215 as in FIG. 3) to a connected state, determining (radio frequency (RF) transceiver 212, MEM 216, PROG 218, DP 214 and/or RRC Module 215 as in FIG. 3) by the user equipment (UE 10 as in FIG. 3) that the communication quality with the at least one measured cell is larger than a threshold; and means for transmitting (radio frequency (RF) transceiver 212, MEM 216, PROG 218, DP 214 and/or RRC Module 215 as in FIG. 3) information comprising a measurement report from the user equipment (UE 10 as in FIG. 3) to a network equipment (eNB 13 as in FIG. 3) that the at least one measured cell meets the threshold for the network equipment to signal the user equipment (UE 10 as in FIG. 3) to configure (radio frequency (RF) transceiver 212, MEM 216, PROG 218, DP 214 and/or RRC Module 215 as in FIG. 3) communication with the at least one measured cell without further measurements from the user equipment (UE 10 as in FIG. 3).

In the example aspect of the invention according to the paragraph above, wherein at least the means for measuring, transitioning, and transmitting comprises a non-transitory computer readable medium [MEM 216 as in FIG. 3] encoded with a computer program [PROG 218 as in FIG. 3] executable by at least one processor [DP 214 and/or RRC Module 215 as in FIG. 3].

In accordance with an example embodiment, an example computer program product is provided, such as memory 215 shown in FIG. 3 for example, comprising program instructions which, when loaded into the user equipment, execute the method described above.

In accordance with an example embodiment, an apparatus is provided comprising at least one processor; and at least one non-transitory memory including computer program code, the at least one memory and the computer program code configured to, with the at least one processor, cause the apparatus to: measure, by the apparatus, a communication quality with at least one measured cell of a communication node while the apparatus is in an idle or inactive state, where the apparatus comprises a user equipment; upon the user equipment transitioning to a connected mode (e.g. due to mobile originated (MO) activity of the user equipment), determine by the user equipment that the communication quality with the cell meets a threshold; and transmit a measurement report from the user equipment to a network equipment that the cell meets the threshold for the network equipment to signal the user equipment to configure communication with the cell without further measurements from the user equipment.

The at least one memory and the computer program code may be configured to, with the at least one processor, cause the user equipment to configure the measurement report with a duration of time in which the cell has met the threshold.

Figure 11:
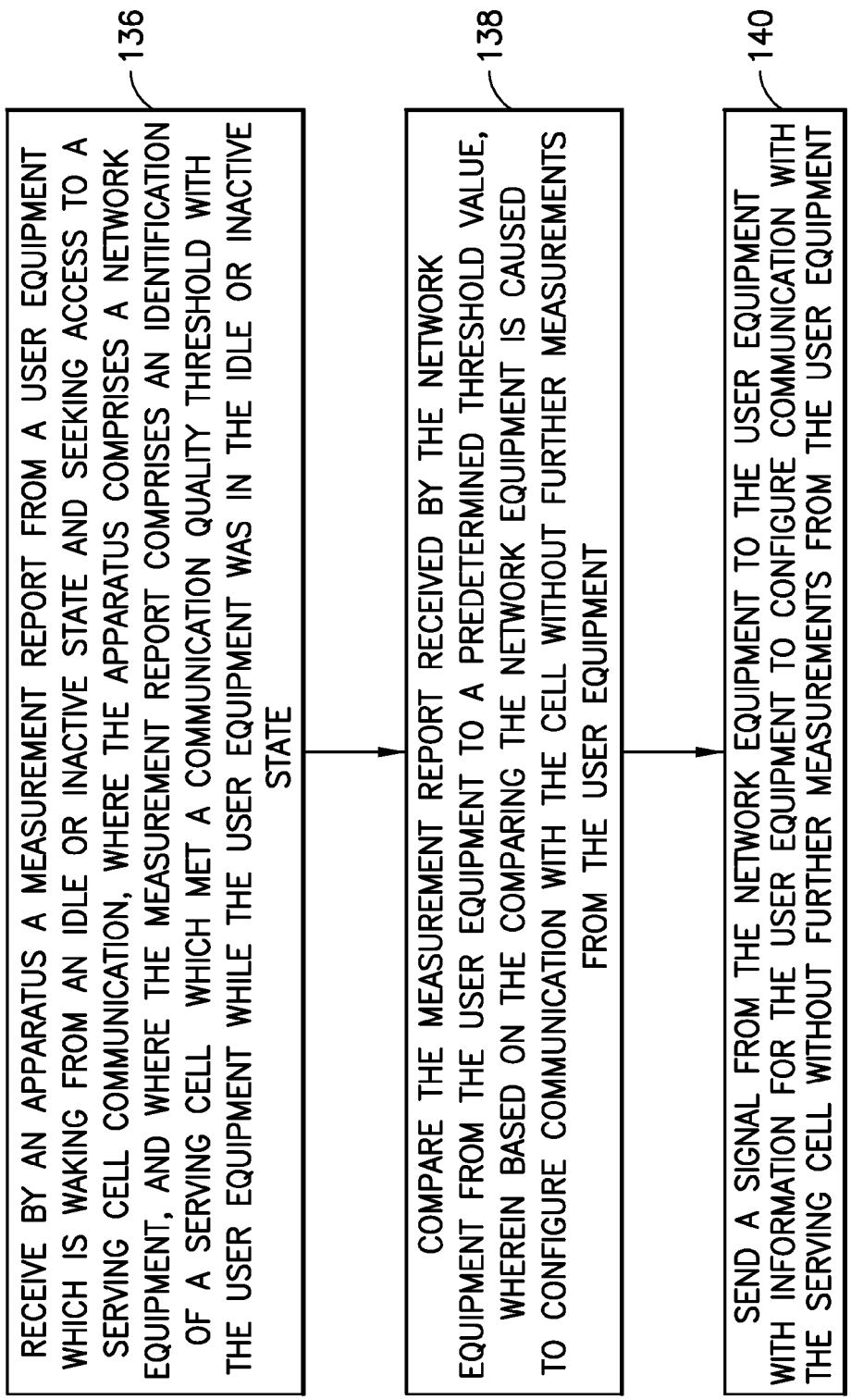

As illustrated by the example in FIG. 11, an example method may comprise receiving by a network equipment (such as the eNB 13 as in FIG. 3) a measurement report from a user equipment which is waking from an idle or inactive state and seeking access to a serving cell communication, wherein the measurement report comprises an identification of a cell which met a communication quality threshold with the user equipment while the user equipment was in the idle or inactive state as illustrated by block 136; comparing the measurement report received by the network equipment from the user equipment to a predetermined threshold value, wherein based on the comparing the network equipment is caused to configure communication with the cell without further measurements from the user equipment as illustrated by block 138; and sending a signal from the network equipment to the user equipment with information for the user equipment to configure communication with the cell without further measurements from the user equipment as illustrated by block 140. In accordance with an example embodiment, an example computer program product is provided, such as memory 226 shown in FIG. 3 for example, comprising program instructions which, when loaded into the user equipment, execute the method described above.

In accordance with the example embodiments as described in the paragraph above, wherein the cell comprises a secondary cell, and wherein the communication quality threshold is based on a measurement reliability condition.

In accordance with the example embodiments as described in the paragraphs above, wherein based on the measurement report indicating that a reference signal received power of the cell is above a quality threshold associated with a timer, the method comprising signaling the user equipment to configure the communication with the at least one measured cell without further measurements from the user equipment, wherein the signaling is causing a starting value 0 of the timer, and wherein based on the measurement report indicating that a reference signal received power of the cell is below a quality threshold associated with a timer, the user equipment is caused to stop and reset the timer.

In accordance with the example embodiments as described in the paragraphs above, wherein the information is based on a measurement report of a cell with a best measurement reliability condition.

In accordance with the example embodiments as described in the paragraphs above, wherein the measurement reliability condition is based on a quality condition preconfigured by the network for the user equipment.

In accordance with the example embodiments as described in the paragraphs above, wherein the quality condition is preconfigured for the user equipment by the network via one of dedicated or broadcast signaling.

In accordance with the example embodiments as described in the paragraphs above, wherein the information comprises an indication of a duration of time of the measurement reliability condition since a last measurement of the cell.

In accordance with the example embodiments as described in the paragraphs above, wherein at least the duration of time of the measurement reliability condition since the last measurement of the cell is for use by the network to determine to configure a connection setup for the user equipment with the secondary cell without further measurements from the user equipment.

A non-transitory computer-readable medium (MEM 226 as in FIG. 3) storing program code (PROG 228 as in FIG. 3), the program code executed by at least one processor (DP 224 and/or RRC Module 225 as in FIG. 3) to perform the operations as at least described in the paragraphs above.

In accordance with an example embodiment of the invention as described above there is an apparatus comprising: means for receiving (radio frequency (RF) transceiver 222, MEM 226, PROG 228, DP 224 and/or RRC Module 225 as in FIG. 3) by a network equipment (eNB 13 as in FIG. 3) information comprising a measurement report from a user equipment (UE 10 as in FIG. 3) which is waking from an idle or inactive state and seeking access to a serving cell communication, wherein the measurement report comprises an identification of a cell which met a communication quality threshold with the user equipment while the user equipment was in the idle or inactive state; comparing (radio frequency (RF) transceiver 222, MEM 226, PROG 228, DP 224 and/or RRC Module 225 as in FIG. 3) the measurement report received by the network equipment (eNB 13 as in FIG. 3) from the user equipment (UE 10 as in FIG. 3) to a predetermined threshold value; and sending (radio frequency (RF) transceiver 222, MEM 226, PROG 228, DP 224 and/or RRC Module 225 as in FIG. 3) a signal from the network equipment (eNB 12 as in FIG. 3) to the user equipment (UE 10 as in FIG. 3) with instructions for the user equipment to configure communication with the cell without further measurements from the user equipment.

In the example aspect of the invention according to the paragraph above, wherein at least the means for receiving, comparing, and sending comprises a non-transitory computer readable medium [MEM 226 as in FIG. 3] encoded with a computer program [PROG 228 as in FIG. 3] executable by at least one processor [DP 224 and/or RRC Module 225 as in FIG. 3].

An example embodiment may be provided in an apparatus comprising: at least one processor [DP 224 and/or RRC Module 225 as in FIG. 3]; and at least one non-transitory memory [MEM 226 as in FIG. 3] including computer program code [PROG 228 as in FIG. 3], the at least one memory and the computer program code configured to, with the at least one processor, cause the apparatus to: receive by the apparatus a measurement report from a user equipment which is waking from an idle or inactive state and seeking access to a serving cell communication, where the apparatus comprises a network equipment, and wherein the measurement report comprises an identification of a cell which met a communication quality threshold with the user equipment while the user equipment was in the idle or inactive state; compare the measurement report received by the network equipment from the user equipment to a predetermined threshold value, wherein based on the comparing the network equipment is caused to configure communication with the cell without further measurements from the user equipment; and send a signal from the network equipment to the user equipment with information for the user equipment to configure communication with the cell without further measurements from the user equipment.

An example apparatus may comprise means for measuring, by a user equipment [e.g., UE 10 as in FIG. 3], a communication quality with at least one cell of a communication node [e.g., eNB 13 as in FIG. 3] while the user equipment is in an idle or inactive state; means for, upon the user equipment transitioning to a connected state (for example due to mobile originated (MO) activity of the user equipment), determining by the user equipment that the communication quality with the cell meets a threshold; and means for transmitting a measurement report from the user equipment to a network equipment that the cell meets the threshold for the network equipment to signal the user equipment to configure communication with the cell without further measurements from the user equipment.

An example apparatus may comprise means for receiving by a network equipment a measurement report from a user equipment which is waking from an idle or inactive state and seeking access to a cell communication, wherein the measurement report comprises an identification of a cell which met a communication quality threshold with the user equipment while the user equipment was in the idle or inactive state; means for comparing the measurement report received by the network equipment from the user equipment to a predetermined threshold value, wherein based on the comparing the network equipment is caused to configure communication with the cell without further measurements from the user equipment; and means for sending a signal from the network equipment to the user equipment with information for the user equipment to configure communication with the cell without further measurements from the user equipment.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
    measuring, by a user equipment, a communication quality with at least one measured cell of a communication node while the user equipment is in an idle or inactive state;
    upon the user equipment transitioning to a connected state, determining by the user equipment that the communication quality with the at least one measured cell is larger than a threshold; and transmitting information comprising a measurement report from the user equipment to a network equipment, where the information, that the at least one measured cell meets the threshold, is configured to be used by the network equipment to signal the user equipment to configure communication with the at least one measured cell without further measurements from the user equipment, wherein the measurement report comprises a duration of time in which the at least one measured cell has met the threshold, and wherein the duration of time is related to a reliability condition of the measurement report comprising a duration of time since a last measurement of the at least one measured cell.

2. The method as in claim 1, wherein the at least one measured cell comprises a secondary cell, and wherein the communication quality is based on a measurement reliability condition.

3. The method as in claim 2, wherein the information is based on a measurement report of a cell of the at least one measured cell with a best measurement reliability condition.

4. The method as in claim 3, wherein the measurement reliability condition is determined based on a quality condition preconfigured by the network for the user equipment.

5. The method as in claim 4, wherein the quality condition is preconfigured for the user equipment by the network via one of dedicated or broadcast signaling.

6. The method of claim 3, and wherein the duration of time is since a last measurement when the cell was not fulfilling the configured quality condition.

7. A method comprising:

measuring, by a user equipment, a communication quality with at least one measured cell of a communication node while the user equipment is in an idle or inactive state;

upon the user equipment transitioning to a connected state, determining by the user equipment that the communication quality with the at least one measured cell is larger than a threshold; and transmitting information comprising a measurement report from the user equipment to a network equipment, where the information, that the at least one measured cell meets the threshold, is configured to be used by the network equipment to signal the user equipment to configure communication with the at least one measured cell without further measurements from the user equipment, wherein upon the user equipment transitioning to the connected state the method comprises:

starting, by the user equipment, a timer to record a duration of time that the communication quality with the at least one measured cell has met the threshold, wherein the timer is configured by the network for the user equipment; and wherein the measurement report comprises the duration of time in which the at least one measured cell has met the threshold, and wherein the duration of time is related to a reliability condition of the measurement report comprising a duration of time since a last measurement of the at least one measured cell.

8. A method comprising:

measuring, by a user equipment, a communication quality with at least one measured cell of a communication node while the user equipment is in an idle or inactive state;

upon the user equipment transitioning to a connected state, determining by the user equipment that the communication quality with the at least one measured cell is larger than a threshold; and transmitting information comprising a measurement report from the user equipment to a network equipment, where the information, that the at least one measured cell meets the threshold, is configured to be used by the network equipment to signal the user equipment to configure communication with the at least one measured cell without further measurements from the user equipment, wherein upon the user equipment transitioning to the connected state the method comprises:

starting, by the user equipment, a timer to record a duration of time that the communication quality with the at least one measured cell has met the threshold, and wherein the timer is stopped based on one of the user equipment leaving the idle or inactive state, and based on the user equipment not obtaining measurements during the length of time;

wherein the measurement report comprises the duration of time in which the at least one measured cell has met the threshold, and wherein the duration of time is related to a reliability condition of the measurement report comprising a duration of time since a last measurement of the at least one measured cell.

9. An apparatus, comprising:

at least one processor; and at least one non-transitory memory including computer program code, wherein the at least one memory and the computer program code are configured, with the at least one processor, to cause the apparatus to at least:

measure, by a user equipment, a communication quality with at least one measured cell of a communication node while the user equipment is in an idle or inactive state;

upon the user equipment transitioning to a connected state, determine by the user equipment that the communication quality with the at least one measured cell is larger than a threshold; and transmit information comprising a measurement report from the user equipment to a network equipment, where the information, that the at least one measured cell meets the threshold, is configured to be used by the network equipment to signal the user equipment to configure communication with the at least one measured cell without further measurements from the user equipment, wherein the measurement report comprises a duration of time in which the at least one measured cell has met the threshold, and wherein the duration of time is related to a reliability condition of the measurement report comprising a duration of time since a last measurement of the at least one measured cell.

10. The apparatus as in claim 9, wherein the at least one measured cell comprises a secondary cell, and wherein the communication quality is based on a measurement reliability condition.

11. The apparatus as in claim 10, wherein the information is based on a measurement report of a cell of the at least one measured cell with a best measurement reliability condition.

12. The apparatus as in claim 11, wherein the measurement reliability condition is determined based on a quality condition preconfigured by the network for the user equipment.

13. The apparatus as in claim 12, wherein the quality condition is preconfigured for the user equipment by the network via one of dedicated or broadcast signaling.

14. The apparatus of claim 11, and wherein the duration of time is since a last measurement when the cell was not fulfilling the configured quality condition.

15. The apparatus as in claim 9 wherein upon the user equipment transitioning to the connected state the at least one memory including the computer program code is configured with the at least one processor to cause the apparatus to:

start, by the user equipment, a timer to record the duration of time that the communication quality with the at least one measured cell has met the threshold, wherein the timer is configured by the network for the user equipment.

16. The apparatus according to claim 9 wherein upon the user equipment transitioning to the connected state the at least one memory including the computer program code is configured with the at least one processor to cause the apparatus to:

start, by the user equipment, a timer to record the duration of time that the communication quality with the at least one measured cell has met the threshold, wherein the timer is stopped based on one of the user equipment leaving the idle or inactive state, and based on the user equipment not obtaining measurements during the length of time.

* * * * *